UNITED STATES PATENT OFFICE.

MANUEL F. PERMUY, OF NEW YORK, N. Y.

SILVERING PROCESS.

1,324,690.      Specification of Letters Patent.      Patented Dec. 9, 1919.

No Drawing.      Application filed September 19, 1919. Serial No. 324,967.

*To all whom it may concern:*

Be it known that I, MANUEL F. PERMUY, a subject of the King of Spain, residing at New York, in the county of New York and State of New York, have invented new and useful Improvements in Silvering Processes, of which the following is a specification.

The present invention relates to the silvering or resilvering of mirrors by the employment of a novel silvering composition herein described, whereby the silvering can readily be effected entirely at atmospheric temperature, that is to say, there is no application of heat necessary, in the entire process, after the solutions have been prepared.

If the plate of glass has previously been silvered, that is to say, if it is a question of re-silvering an old mirror, the surface of the glass is first polished with a suitable very fine detergent composition, such as English red, this being applied by means of a rubber consisting of felt wrapped around a piece of wood. During this operation considerable pressure should be applied, the glass, of course, being laid upon a perfectly flat and smooth surface. The plate is then washed with running water until thoroughly cleaned, after which it is cleaned with a solution of stannous chlorid crystals. This solution is rubbed in carefully with a brush, after which the whole surface is washed with distilled water, and allowed to drain, and is then ready for the silvering operation.

When it is a question of silvering glass which has not previously been silvered, the glass is first thoroughly cleaned and washed and dried. To this dry cleaned glass is then applied the silvering solution or mixture. This silvering composition is preferably made up of three parts, *a*, *b* and *c*. For formula *a*, I preferably employ 250 grams of distilled water, and 5 grams of crystallized silver nitrate. After this mixture has stood for about ten minutes, or long enough for the nitrate crystals to dissolve, about 50 grams of ammonia water of 22% are added, the mixture well shaken or stirred and filtered.

Ingredient *b* is prepared by adding 5 grams of caustic soda (which should be the pure article) to 250 grams of distilled water. This is allowed to stand until thoroughly dissolved and is then stirred up or mixed and is poured through the same filter as ingredient *a*, above referred to. This produces a mixture which is made up to one liter with distilled water, the water preferably being also filtered.

A separate ingredient *c* is prepared by dissolving 50 grams of pure cane sugar crystals in 400 grams of distilled water and adding 4 grams of nitric acid (pure concentrated). The mixture is boiled together for about 12 minutes, is then cooled and 100 grams of pure grain alcohol (90 or 95% strength) is added. Enough pure water is added to bring the volume up to 1000 c. c. This solution is then filtered.

When it is desired to perform the silvering operation, 10 parts by volume of the liquid *c* are added to 100 parts by volume of the compound liquid *a* and *b*, and the mixture is at once poured upon the glass (the edges being built up in any suitable manner to form a trough or pan). This liquid, after standing for six or eight minutes, is seen to thicken and to lose its transparency, and the metallic silver is thereby precipitated upon the glass in a condition in which it adheres readily to the surface of the glass. When the metal-precipitating operation has completed itself, the surplus liquid is poured off and the silvered surface is pounced or pounded with a clean chamois skin, it being desirable to apply the chamois skin by sharp strokes all over the surface so that any aggregations or irregularities in the surface formed by the silvering liquid will be completely flattened out. During this operation care should be taken that the chamois skin (which should be held in the form of a cushion resembling a pounce bag) does not slip or slide over the surface, which would tend to break the thin delicate film of silver.

After this operation, wash well with running water, allow to drain and finally wash with distilled water.

The plate is then lifted up and stood on its edge, care being taken not to touch the new silvering. The liquid is then allowed to thoroughly drain off so that the new silvering can nearly dry. The excess of silver which will then flow to the bottom edge of the plate can then be wiped off and then the back of the mirror is coated with a suitable varnish composition, for example, 500 parts of shellac dissolved in 1000 parts of alcohol. The mirror is then allowed to dry thoroughly, say, for about four hours, and an impermeable varnish is applied. This impermeable varnish may consist of the following: oil of turpentine 2000 grams; asphaltum 400 grams; gum dammar 400 grams; plumbago 300 grams; kaolin 300 grams. If this is too thick, a little more of the turpentine can be added and if too thin, a little more of the gum dammar can be added.

The unsilvered side of the mirror (the front) can then be cleaned with any suitable cleaning composition, for example, impalpable powdered pumice and alcohol applied with a cotton rag.

I claim:

1. In the process of silvering mirrors, the step of applying to the glass, at about atmospheric temperature, a solution containing as its essential constituents the reaction products of silver nitrate, ammonia water and fixed caustic alkali, and the reaction products of nitric acid, cane sugar and alcohol.

2. In the process of silvering mirrors, the step of applying to the glass, at about atmospheric temperature, a solution containing as its essential constituents the reaction products of a mixture of 100 volumes of a liquid containing 5 parts silver nitrate, 50 parts of 22% ammonia water, 5 parts of NaOH, about 1000 parts of water, and about 10 parts of a liquid comprising the reaction products of 50 parts cane sugar, 4 parts nitric acid, 100 parts ethyl alcohol and about 1000 parts of water.

In testimony whereof I have affixed my signature.

MANUEL F. PERMUY.